Figure 8:
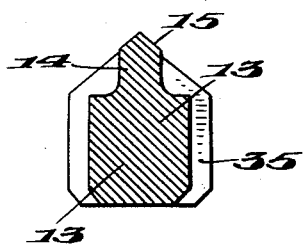

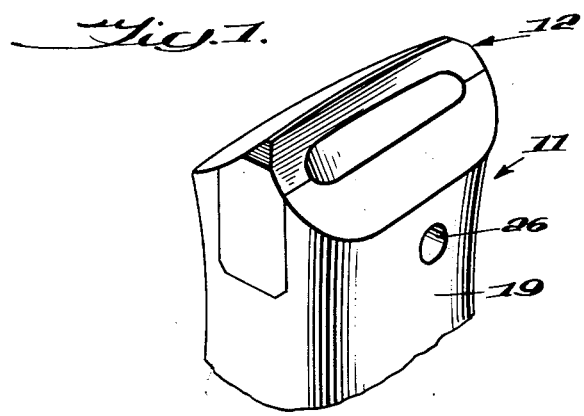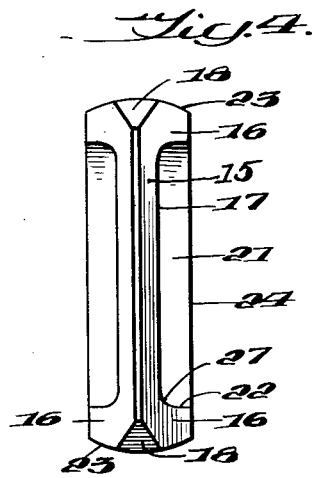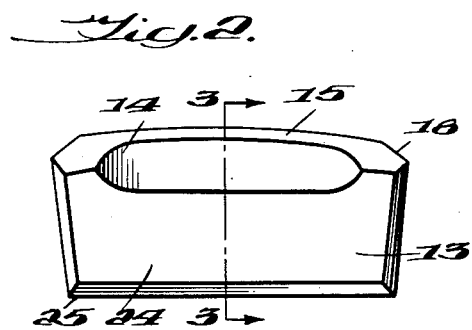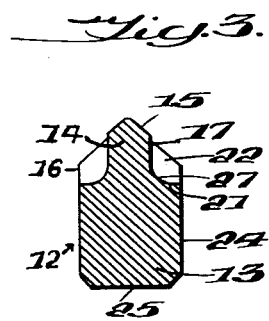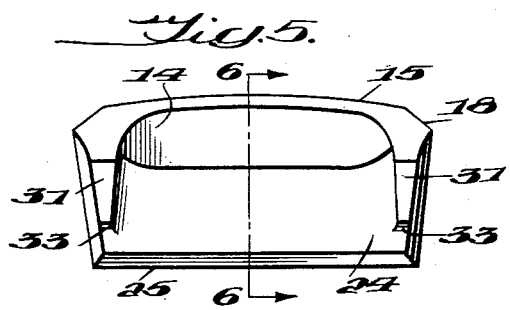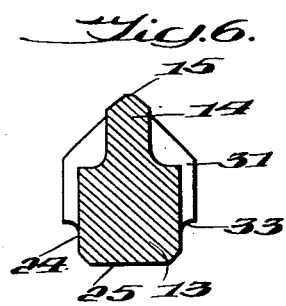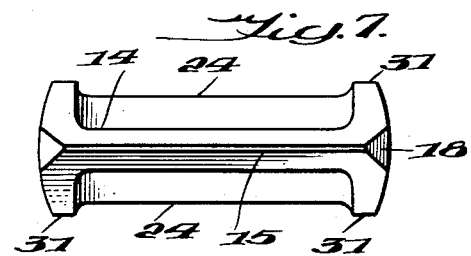

May 15, 1962  N. G. A. HAGSTRÖM  3,034,589
CUTTING INSERT FOR PERCUSSION DRILL BITS
Filed Dec. 23, 1960  2 Sheets-Sheet 2

United States Patent Office 3,034,589
Patented May 15, 1962

3,034,589
CUTTING INSERT FOR PERCUSSION DRILL BITS
Nils Gustav August Hagström, Sandviken, Sweden, assignor to Sandvikens Jernverks Aktiebolag, Sandviken, Sweden, a corporation of Sweden
Filed Dec. 23, 1960, Ser. No. 78,048
Claims priority, application Sweden Dec. 30, 1959
2 Claims. (Cl. 175—410)

The present invention relates to a cutting insert preferably of sintered hard metal for percussion drill bits, said insert comprising a base portion and a ridge portion which protrudes from the base portion and is thin in comparison with the same, the ridge being provided with a fore cutting edge portion.

Cutting inserts of this kind need no resharpening, as the ridge works as a cutting edge till it is worn away. In certain hard rocks mainly the edge is worn down (height wear) while in other rocks, as quartzite, the wear is more pronounced at the corners and the ends of the insert at the periphery of the drill bit (diameter wear). The diameter wear and the wear at the end corners gives a forwardly tapering shape of the drill bit, so called inverse taper or anti-taper, which may result in jamming of the bit causing substantial inconveniences e.g. drill rod failures.

The formation of inverse taper may make the insert unusable before the ridge is worn down. A more effective utilization of the insert can be achieved if the inverse taper is counteracted by placing sintered carbide portions in the periphery of the drill bit. This can, according to the invention, be done by providing the cutting insert with flange portions which protrude from the base portion of the insert at the periphery of the bit. The invention is characterized in that at least one end of the ridge is connected to a flange portion, which protrudes from the base portion in the drilling direction and is situated along the periphery or end surface of the cutting insert. The flange portion may protrude from the base portion also sideways on one or both sides of the insert and it may extend along the whole height of the insert. It may in the last mentioned case also comprise a part protruding rearwardly from the base portion.

The drill bit may be provided with one cutting insert according to the invention, for instance a chisel insert, or several inserts, for instance four inserts placed crosswise or like an X. The insert should preferably consist of sintered hard metal, this expression comprising a sintered product, preferably an alloy, which contains one or several carbides, e.g. carbide of tungsten and/or other hard substances together with one or several binding metals as cobalt and/or other metals of the iron group of the periodic system. Also sintered ceramics as oxide of aluminum are included in the above mentioned expression "sintered hard metal."

The invention will be described in connection with the accompanying drawings which illustrate a number of embodiments of the invention.

Figure 9:
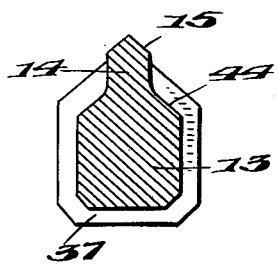
Figure 10:
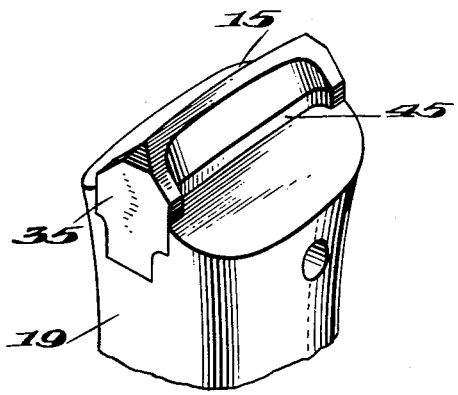
Figure 11:
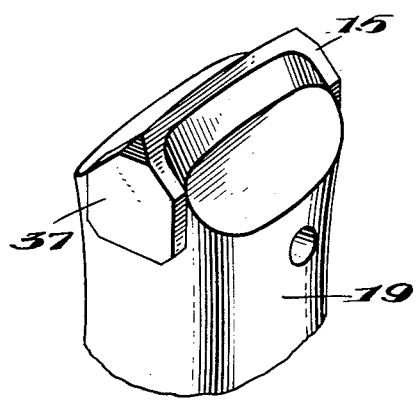
Figure 12:
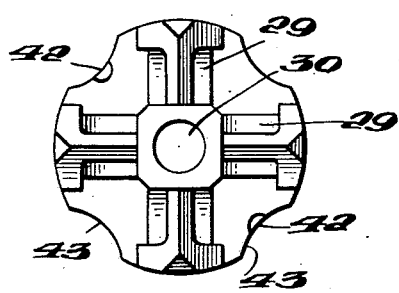

FIG. 1 shows in perspective a drill bit provided with an insert according to the invention;
FIG. 2 shows a side view of an insert;
FIG. 3 is a section along the line 3—3 of FIG. 2;
FIG. 4 is a view from above of the same insert;
FIG. 5 shows a side view of another embodiment of the insert;
FIGURES 6 and 7 are respectively a section along the line 6—6 in FIG. 5 and a view from above of the insert in FIG. 5;
FIGS. 8 and 9 show similar sections of different embodiments of the insert;
FIGS. 10 and 11 show in perspective drill bits with inserts according to the invention, and
FIG. 12 shows a drill bit with four inserts placed crosswise.

The drill bit 11 shown in FIGURE 1 can either be a part of the drill rod or be detachably connected to the drill rod. The bit is provided with a cutting insert 12 made of sintered hard metal and fastened in a recess or in some other way in the bit. 26 is the orifice of the flushing channel. The insert, as appears from FIGURES 2–4, comprises a ridge 14 situated on the main or base portion 13 of the insert. The ridge 14 has a cutting edge portion 15, which is shown with a wedge-shaped cross section but may also have a rounded or flat cross section. The cutting edge portion is, at its ends, provided with bevelings 18. The insert is also provided with flange portions 16, which are connected to the ridge 14.

As appears from FIGURES 2–4 the ridge 14 extends between the flange portions 16. The side surfaces 17 of the ridge may be parallel or forwardly slightly converging. These side surfaces 17 are connected to the front surfaces 21 of the base part 13 and the inner surfaces 22 of the flanges 16 by rounded interconnecting surfaces 27. The ridge has at its front part behind the cutting edge suitably a thickness of 2–6, preferably 3–5 mm., e.g. 4 mm., and has as shown in FIGURE 2, along the major part, substantially equal height over the base portion 13. This height is suitably between 3 and 8 mm., preferably between 5 and 7 mm., e.g. 6 mm. The flange portions have preferably a thickness of 2–5 mm., suitably 3–4 mm. They can, as shown in FIGURES 2–4, taper slightly but they can also have parallel sides.

The base portion 13 of the insert has conveniently parallel side surfaces 24 and should be substantially thicker than the ridge 14 and have a thickness in the main equal to conventional inserts for percussion drilling, e.g. 8–12 mm., preferably about 10 mm. The height of the base portion from its base surface 25 to its upper surfaces 21 may be of the size order 8–14 mm., e.g. 10 mm. For less hard minerals this height can be smaller, e.g. 5–8 mm. The thickness of the ridge should be at most one-half, preferably one-third, of the thickness of the base portion and, as mentioned, suitably 2–6 mm. or slightly more for large drill bits. The cutting edge may, in its length direction, be straight or convex with a radius from 50 mm. or greater preferably about 100 mm. The upper surface 21 of the base portion may be straight at the main central part and concavely curved at its ends, where it is connected to the flanges 16, with a radius of e.g. 10 mm. Usually the ridge 14 is placed centrally along the base portion 13, but it could also be placed diagonally. The end surfaces 23 of the insert may be cylindrical, conical or plane.

The embodiment of FIGURES 5–7 comprises an insert with flanges 31, which protrude outside of the side surfaces 24 and have their lower end surface 33 above the bottom surface 25 of the insert. The embodiment in FIGURE 8 comprises flanges 35 extending along the whole height of the base portion 13, and FIGURE 9 shows an embodiment with a rearwardly protruding flange 37. The sideward and rearward extensions of the flanges 35 and 37 should preferably be within the limits 1–4 mm., e.g. 2 mm.

Inserts according to all these different embodiments may be fastened in the drill bit either with the flanges e.g. the flange 35, countersunk in the drill bit body 19 as shown in FIGURE 10 or the flanges e.g. the flange 40 may be outside the periphery surface of the drill bit body 19 as shown in FIGURE 11. The side surfaces of the base portion of the insert may protrude from the slot in the drill bit as shown at 45 in FIGURE 10 or be wholly embedded by the slot as shown in FIGURE 11.

The front surfaces of the base portion of the insert can be in the main perpendicular to the drill bit axis as are the surface 21 in FIGURE 3 or they may be placed at an angle to said axis as are the surface 44 in FIGURE 9. This angle should be 45°–90°.

FIGURE 12 shows a drill bit with four cutting inserts 29, which are provided with flanges only at one end and have a length smaller than half the diameter of the drill bit. The orifice of the flushing channel 26 in FIGURE 1 is shown placed at the side of the bit but could also be placed at the front surface. The flushing channel 30 in FIGURE 12 is placed in the center of the bit. The placing of the flushing channel often depends of whether pressure or suction flushing is used. There could for instance be additional orifices as shown at 42 in FIGURE 12. Recesses 43 are provided for the removal of detritus. The number of inserts in the bit according to FIGURE 12 can be two or more. There could also be one long insert across the bit and several shorter inserts running from the center.

Percussion drill bits with inserts according to the invention will not need resharpening before the ridge is worn down, as the ridge is so thin that it, without special sharpening, gives a satisfying cutting edge. This is especially advantageous in drilling long holes, as the drill will not have to be drawn out from the hole and the lengthening rods detached in order to resharpen the bit, before the hole is finished. The penetration effect of the drill will remain constant as long as the insert ridge is not worn down. Experience has shown that the ridge may last during the whole life of the drill at least for certain kinds of rock. If for some kind of rock the drill could be used even after the ridge has been worn down, it is of course possible to grind the insert and provide it with a new ridge or give it the shape of a conventional insert.

The flanges e.g. 16, 31, 35 and 37 are advantageous because of their effect of counteracting inverse taper or anti-taper, which occurs especially in diameter wearing rock and results in bad drilling effect and also may cause jamming of the bit and drill rod failures. This anti-taper will be counteracted if the carbide material is more extensive at the periphery of the drill bit, which is achieved by aid of the flanges. The flanges give a larger area of wear resistant hard metal carbide in the periphery of the bit but do not cause any reduction of the steel material of the bit at the central part along the sides of the insert, which would be the case if the whole insert were made as thick as the width of the flanges. If the fastening slot is too wide, the remaining steel walls along the sides of the slot will be too thin and weak to hold the insert.

It is also possible according to the invention to make the whole fore part of the bit of sintered hard metal, in which case the inserts are an integral part of said fore part.

As an example of the invention can be mentioned a cutting insert with a total height of 17 mm., a length of 31 mm. and a thickness of the base portion of 10 mm. The thickness of the ridge is 4 mm. and the width of the flanges along the periphery is the same as the thickness of the base portion, i.e. 10 mm. The height of the ridge is 6 mm. and its side surfaces are plane and parallel. The side surfaces of the ridge are connected to the fore surfaces of the base portion and the inner surfaces of the flanges by a connecting surface with a radius of 2 mm. The thickness of the flanges is 4 mm. adjacent to the ridge. The radius of curvature of the end surfaces of the insert is 15 mm. and the thickness of the flanges decreases slightly towards the sides of the insert. The cutting edge is convex with a radius of 100 mm., and the ends of the front surfaces of the base portion are concave with a radius of 10 mm., the middle part being straight.

Another example is an insert with the same measurements as above mentioned except for the width of the flanges, this being instead 14 mm. and the flanges protruding sideways from the base portion 2 mm. on each side and having their lower end surfaces 5 mm. above the bottom surface of the insert. Variations of this latter example are inserts having the lower end surfaces of the flanges level with the base surface of the insert or having flanges, which protrude 2 mm. rearwardly from the base surface.

The invention is not restricted to the described embodiments but comprises any cutting insert and drill bit within the scope of the following claims.

The invention of this application, i.e. the provision of a drill bit insert cutting edge ridge with an end or peripheral flange is applicable generally to drill bit inserts of this type such as those disclosed in other applications assigned to the assignee of the present application, namely an application in the name of Curt Wilhelm Dahlin Ser. No. 807,573 filed April 20, 1959, now Patent No. 3,006,424, an application in the name of Curt Wilhelm Dahlin Ser. No. 808,617 filed April 24, 1959, and an application in the name of John Anders Hjalsten, Ser. No. 15,587 filed March 17, 1960.

I claim:

1. A drill bit comprising a drill bit body made of steel and having a channel shaped recess therein, said recess having substantially parallel side walls, a cutting insert made of sintered hard metal having a body portion having substantially parallel side surfaces and an integral ridge portion, said body portion occupying said recess in said drill bit body and said ridge portion protruding above said drill bit body, said ridge portion consisting of a cutting edge portion having substantially parallel side surfaces and having a thickness not more than half of the thickness of said body portion and within the range from about 2 to about 6 mm., the length of said ridge portion being at least several times its height, and an integral flange portion at at least one end of said cutting edge portion, said flange portion extending upwardly from said body portion to the top of said edge portion and laterally to the planes of said side surfaces and having its end wall surface flush with the end wall surface of said body portion.

2. A drill bit as defined in claim 1 in which the recess in the drill bit body extends diametrically across the front end thereof and the insert extends the entire length of said recess and there is a flange portion at each end of said cutting edge portion.

References Cited in the file of this patent

UNITED STATES PATENTS

| 202,023 | Grubs | Apr. 2, 1878 |
| 562,479 | Muirhead | June 23, 1896 |
| 2,707,619 | Anderson | May 3, 1955 |
| 2,751,195 | Edstrom et al. | June 19, 1956 |
| 2,889,138 | Haglund | June 2, 1959 |

FOREIGN PATENTS

| 324,562 | Switzerland | Nov. 15, 1957 |